（12）United States Patent
Wittner

(10) Patent No.: US 7,282,924 B1
(45) Date of Patent: Oct. 16, 2007

(54) COMPUTERIZED ELECTRICITY SYSTEM HAVING AN ARC FAULT DETECTING SUB-SYSTEM

(75) Inventor: Lupu Wittner, Netanya (IL)

(73) Assignee: Target Hi-Tech Electronics Ltd., Netanya (IL)

( * ) Notice: Subject to any disclaimer, the term of this patent is extended or adjusted under 35 U.S.C. 154(b) by 0 days.

(21) Appl. No.: 11/427,345

(22) Filed: Jun. 29, 2006

(51) Int. Cl.
*G01R 31/08* (2006.01)
*H01H 9/50* (2006.01)
*H02H 3/00* (2006.01)

(52) U.S. Cl. .................. 324/536; 361/42; 700/293
(58) Field of Classification Search ............... 324/536, 324/522; 361/42, 57; 702/58, 64; 700/292, 700/293
See application file for complete search history.

(56) References Cited

U.S. PATENT DOCUMENTS

| 6,242,922 | B1 * | 6/2001 | Daum et al. ................. 324/520 |
| 7,110,864 | B2 * | 9/2006 | Restrepo et al. ............. 700/293 |
| 2003/0030448 | A1 * | 2/2003 | Sapir .......................... 324/536 |
| 2006/0215335 | A1 * | 9/2006 | Deshpande et al. .......... 361/42 |

* cited by examiner

Primary Examiner—Anjan Deb
(74) Attorney, Agent, or Firm—Mark M. Friedman

(57) ABSTRACT

A computerized electricity system for connecting loads to a power source, including: (a) an arc fault detecting sub-system having at least one module including: (i) a relay unit, electrically associated with a particular load, for connecting and disconnecting to a power source; (ii) a current source for measuring a current being delivered from the power source to the load, to produce a current measurement; (iii) an analog circuit for receiving the current measurement from the current sensor, and for producing an analog signal based on the current measurement, and a second signal for indicating a potential arc fault event, and (iv) a digital circuit for receiving the second signal from the analog circuit and producing data, and (b) a processing unit connected to each module, so as to receive data corresponding to the analog signal, and the data from the digital circuit, the processing unit for identifying the arc faults, and wherein the processing unit is configured to command the relay unit to disconnect the current in response to identifying the arc faults, and wherein the processing unit is configured to provide this command only if several pre-determined conditions are met, (I) after detection of the potential arc fault event, the current measurement remains substantially unchanged, and (II) after a detection of at least one addition potential arc fault event, the arc fault events are found to be acyclic.

20 Claims, 6 Drawing Sheets

COMPUTERIZED ELECTRICITY SYSTEM HAVING AN ARC FAULT DETECTING SUB-SYSTEM

FIELD AND BACKGROUND OF THE INVENTION

The present invention relates to computerized electricity systems, more particularly, to fault detecting systems and methods, and, more particularly, to an arc fault detecting system and method.

There are various conditions that may cause an arc fault. Corroded, worn or aged wiring or insulation, worn power cords, old wall outlets with insufficient contact pressure, electrical stress from repeated overloading, etc., may result in an arc fault. These conditions may damage the insulation of the wiring and create excessive heating temperatures. Arc faults may result in a fire depending on various conditions, such as if combustible materials are in close proximity.

There are also various conditions that may result in a false arc fault. For example, the occurrence of an arc fault in one branch circuit of a power distribution system may generate a false arc in another branch circuit. As a result, circuit breakers in more than one branch circuit may erroneously trip. Another example is a relatively noisy load such as an electric drill creating a high frequency disturbance in the circuit, which may appear to be an arc fault.

There are two types of arc faults that may occur in a home. A first type is a high-energy arc that may be related to high current faults; a second type is a low current arc that may be related to persistent momentary contact of electrical conductors. The first type may result from inadvertent connection between a line conductor and neutral conductor or a line conductor and ground. The first type may draw current that is above the rated capacity of the circuit, arcing as the contacts are physically joined.

The other type of arc fault, the momentary contact of electrical conductors, may be considered more problematic. Since the current in the arc may be limited to less than the trip rating of an associated circuit breaker, such arcs may become persistent without observation and may result in certain conditions. Contact arcs may be caused by springs in switches that become worn which, in turn, may reduce the forces that hold electrical contacts together. As the electrical contacts heat and cool down, the conductors may touch and separate repeatedly, thereby possibly creating arcs known as "sputtering arcs".

Contact arcs or sputtering arcs may also be observed in contacts made from different materials. For example, aluminum wiring that contacts copper wiring may oxidize at the contact points. In this case, a non-conductive layer may build up over time between the contact points and arcing may result. Sputtering arcs may also be observed in extension cords having insufficient current carrying capacity. As the plug is heated by resistance heating, insulating materials around the contacts may eventually melt and flow into the contact area, preventing proper contact from being made. The current in the conductors may produce magnetic repulsion forces that push the conductors apart, resulting in an arc. The arc may be extinguished as the current passes through zero. Mechanical or electro-static forces may bring the conductors back into contact, and the cycle may be repeated.

It is believed that various circuit breakers are not specifically designed to guard against sputtering arcs. Special purpose detectors have been designed to detect sputtering arcs and, when detected, trip the circuit breakers. Some detectors may depend on the sputtering arcs exceeding a predetermined current or voltage threshold before tripping the circuit breaker; other detectors are believed to depend on the sputtering arcs having a specific high frequency signature. Still other detectors are believed to depend on the sputtering arcs producing a wideband high frequency noise ranging from 10 kHz to 1 GHz while the arc is conducting current. These detectors may require that no noise be produced while the arc is not conducting current, i.e., during the gaps between arc conduction. These detectors use various processing techniques to analyze the repetitive patterns in the noise.

U.S. Pat. No. 6,459,273 discloses a sputtering arc fault detector for a system having an electrical conductor carrying current to a load. The sputtering arc fault detector includes a current monitor coupled to the conductor for generating a variable signal responsive to behavior of the current in the conductor. A level detector is coupled to the monitor and generates a first pulse when the variable signal exceeds a first level. A step detector is coupled to the monitor and is responsive to rapid step increases of the variable signal. The step detector generates a second pulse when the variable signal exceeds a second level. An arc verifier, which is coupled to the level detector and the step detector, combines the first and second pulses, and generates a fault signal when the combined pulses exceed a third level.

All of these arc fault detection systems are plagued by false alarms, i.e., the systems identify an arc fault and trigger a current shut-off, in situations in which there is no genuine arc fault, or the arc fault is benign. One example of a benign arc fault, or the arc fault is benign. One example of a benign arc fault is when an additional load is connected to the circuit. Low quality and/or aging of a switch may also cause transient arc-fault type effects in the circuit. Some loads characteristically cause the current signal to have arc-fault type attributes. It must be emphasized that the efficacy of an arc fault detection system that triggers, in response to a benign arc fault event—a current shut-off, is greatly compromised, and in many applications, the disadvantages of implementing such a system easily outweigh the potential benefit.

There is therefore a recognized need for, and it would be highly advantageous to have, an arc fault detection system that is robust and reliable, one that triggers current shut-offs in response to genuine arc-fault problems, and identifies and ignores benign arc fault events.

SUMMARY OF THE INVENTION

According to the teachings of the present invention there is provided a computerized electricity system for connecting loads to at least one power source, including: (a) an arc fault detecting sub-system for detecting arc faults, having at least one module including: (i) a relay unit, electrically associated with a particular load, for connecting and disconnecting to a power source; (ii) a current sensor for measuring a current being delivered from the power source to the load, to produce a current measurement; (iii) an analog circuit for receiving the current measurement from the current sensor, and for producing an analog signal based on the current measurement, and a second signal for indicating a potential arc fault event, and (iv) a digital circuit for receiving the second signal from the analog circuit and producing data, and (b) a processing unit connected to each module, so as to receive data corresponding to the analog signal, and the data from the digital circuit, the processing unit for identifying the arc faults, and wherein the processing unit is configured to command the relay unit to disconnect the current in response to identifying the arc faults, and wherein the processing unit is configured to provide this command only if several predetermined conditions are met, (I) after detection of the potential arc fault event, the current measurements remains substantially unchanged, and (II) after a detection of at least one additional potential arc fault event, the arc fault events are found to be acyclic.

According to further features in the described preferred embodiments, the conditions further include: (III) the potential arc fault event and the at least one additional potential arc fault event occur within a pre-determined amount of time.

According to still further features in the described preferred embodiments, the module is configured to check for a high current overload prior to the detecting of the arc faults.

According to still further features in the described preferred embodiments, the module is configured to measure a low current overload for a period of at least 20 milliseconds, and to only subsequently disconnect the current.

According to still further features in the described preferred embodiments, the computerized system is configured to receive, from a user, an input associated with a particular lag time for disconnecting the current, and wherein the module is configured to measure a low current overload over the particular lag time, prior to the current being disconnected.

According to still further features in the described preferred embodiments, the module is configured to check for current leakage prior to the detecting of the arc faults.

According to still further features in the described preferred embodiments, the pre-determined amount of time is at least 0.3 seconds.

According to still further features in the described preferred embodiments, the pre-determined amount of time is at least 1.0 seconds.

According to still further features in the described preferred embodiments, the pre-determined amount of time is at least 3.0 seconds.

According to still further features in the described preferred embodiments, the pre-determined amount of time is a clock cycle of the processing unit.

According to still further features in the described preferred embodiments, the computerized electricity system further includes: (c) a meter, associated with the power supply and a voltage sensor, for providing voltage information to the processing unit.

According to still further features in the described preferred embodiments, the processing unit is configured to utilize the voltage information in evaluating the change in load.

According to still further features in the described preferred embodiments, the processing unit is configured to utilize the voltage information to neutralize an effect of voltage fluctuation on the change in load.

According to still further features in the described preferred embodiments, the second signal is a digital signal.

According to another aspect of the present invention there is provided a computerized electricity system for connecting loads to at least one power source, the computerized electricity system including: an arc fault detecting sub-system for detecting arc faults, the sub-system including: (a) at least one relay unit, electrically associated with a particular load of the loads, the relay unit for connecting and disconnecting to a power source of the at least one power source; (b) at least one current sensor for measuring a current being delivered from the power source to the load, so as to produce a current measurement; (c) a processing unit electrically connected to the relay unit and to the current sensor, the processing unit configured so as to receive a signal corresponding to the current measurement, and wherein the processing unit is configured to command the relay unit to disconnect the current in response to the detecting of the arc faults, and wherein the processing unit is configured to provide the command only if several pre-determined conditions are met, the conditions including: (I) after detection of the potential arc fault event by the processing unit, using the signal, the current measurement is substantially unchanged, and (II) after detection of at least one additional potential arc fault event by the processing unit, using the signal the arc fault events are found to occur in an acyclic fashion.

According to further features in the described preferred embodiments, the conditions further include: (III) the potential arc fault event and the at least one additional potential arc fault event occur within a pre-determined amount of time.

According to still further features in the described preferred embodiments, the processing unit is configured to disconnect the current after the current measurement indicates a low current overload for a period of at least 20 milliseconds.

According to still further features in the described preferred embodiments, the computerized system is configured to receive, from a user, an input associated with a particular lag time for disconnecting the current, and wherein the processing unit is configured to disconnect the current after the current measurement indicates a low current overload for the particular lag time.

According to yet another aspect of the present invention there is provided a computerized electricity system for connecting loads to at least one power source, the computerized electricity system including: an arc fault detecting sub-system for detecting arc faults, the sub-system including: (a) at least one relay unit, electrically associated with a particular load of the loads, the relay unit for connecting and disconnecting to a power source of the at least one power source; (b) at least one current sensor for measuring a current being delivered from the power source to the load, so as to produce a current measurement; (c) a processing unit electrically connected to the relay unit and to the current sensor, the processing unit configured so as to receive a signal corresponding to the current measurement, and wherein the processing unit is configured to command the relay unit to disconnect the current in response to the detecting of the arc faults, and wherein the processing unit is configured to provide the command only if several pre-determined conditions are met, the conditions including: (I) after detection of the potential arc fault event by the processing unit, using the signal, the current measurement is substantially unchanged, and (II) after detection of at least one additional potential arc fault event by the processing unit, using the signal, the arc fault events are found to occur within a pre-determined amount of time.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are used to designate like elements.

In the drawings.

DESCRIPTION OF THE PREFERRED EMBODIMENTS

Figure 1:
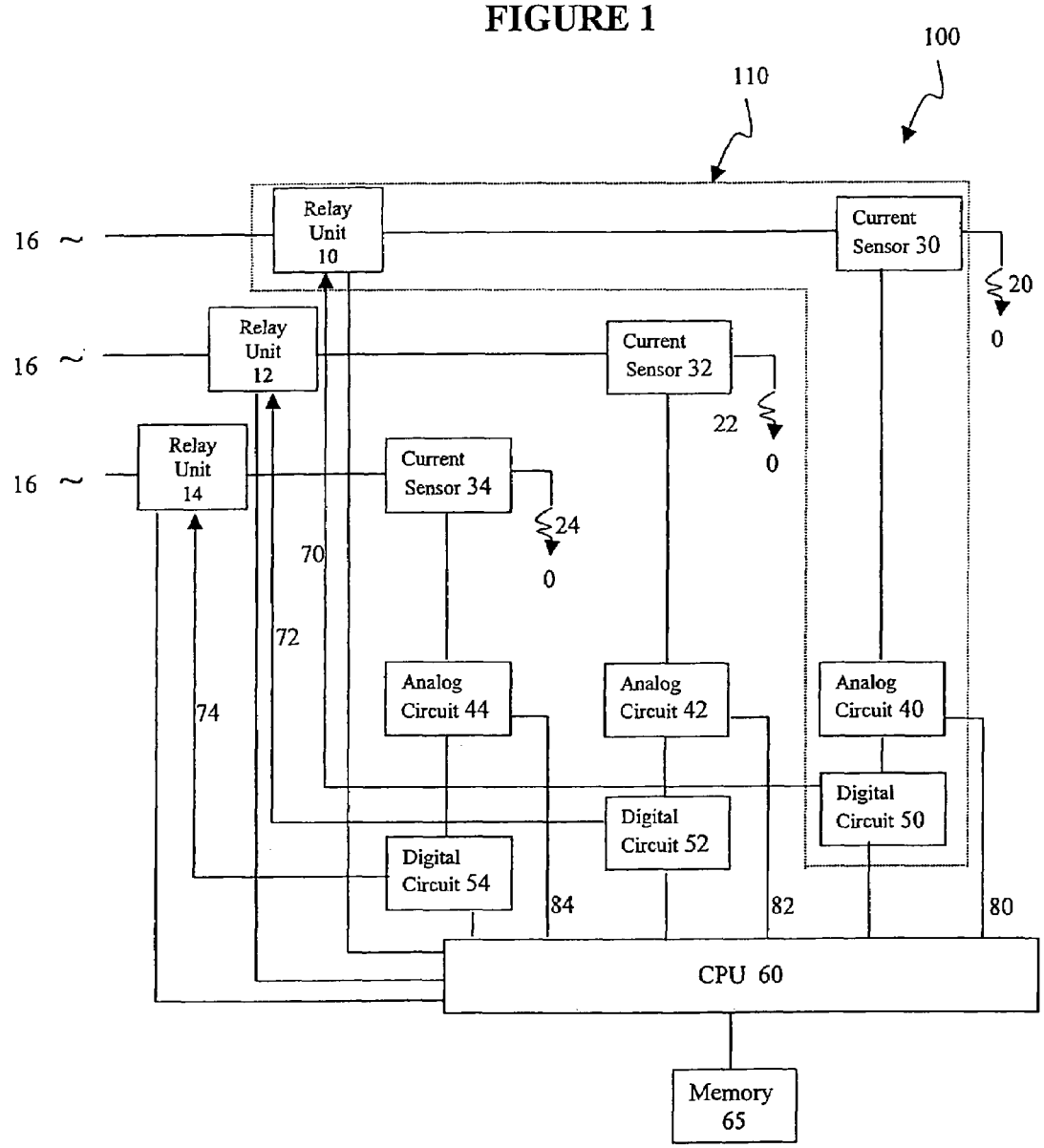
FIG. 1 is a block diagram of a preferred embodiment of the arc fault detecting system according to the present invention.

The present invention is a computerized electricity system having an arc fault detecting sub-system and method for operating such a sub-system.

The principles and operation of the arc fault detecting system and method according to the present invention may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawing. The invention is capable of other embodiments or of being practiced or carried out in various ways. Also, it is to be understood that the phraseology and terminology employed herein is for the purpose of description and should not be regarded as limiting.

Referring now to the drawings, FIG. 1 is a block diagram of a preferred embodiment of fault detecting system 100, according to the present invention. A plurality of relay units 10, 12, 14 is electrically connected to at least one power source 16, and to a plurality of electrical loads 20, 22, 24, via current sensors 30, 32, 34. A common example of electrical loads 20, 22, 24 is a plurality of household appliances. Each of current sensors 30, 32, 34 is associated with at least one of analog circuits 40, 42, 44, which, in turn, are connected with at least one of digital circuits 50, 52, 54. Digital circuits 50, 52, 54 are connected with a processing unit such as central processing unit (CPU) 60, which controls relay units 10, 12, 14. Associated with CPU 60 is memory 65, which stores data on the past behavior of the current drawn by loads 20, 22, and 24. Preferably, memory 65 stores data on the current drawn by loads 20, 22, and 24 during the last three cycles. Memory 65 also stores data indicating the current position of the various relay units, as well as information corresponding to various pre-determined operating positions.

Preferably, digital circuits 50, 52, 54 are directly connected to relay units 10, 12, 14, via electrical lines 70, 72, 74. In the event that either a low overload, a high overload (short circuit), or leakage current is detected, fault detecting system 100 acts to directly turn off relay units 10, 12, 14, by means of digital circuits 50, 52, 54, without having to go through the relatively slow CPU 60. In addition, digital circuits 50, 52, 54 provide CPU 60 with digital data indicating the current position of the relay units, and the high and low overload fault status (0 or 1) that CPU 60 processes to determine potential arc faults.

Analog circuits 40, 42, 44 provide continuous, real-time analog signals 80, 82, 84 to CPU 60. These signals correspond to the current measurements of current sensors 30, 32, 34. As will be described in greater detail hereinbelow, CPU 60 utilizes real-time analog signals 80, 82, 84 along with digital data from digital circuits 50, 52, 54, in determining whether a potential arc fault is indeed an actual arc fault.

Figure 7:
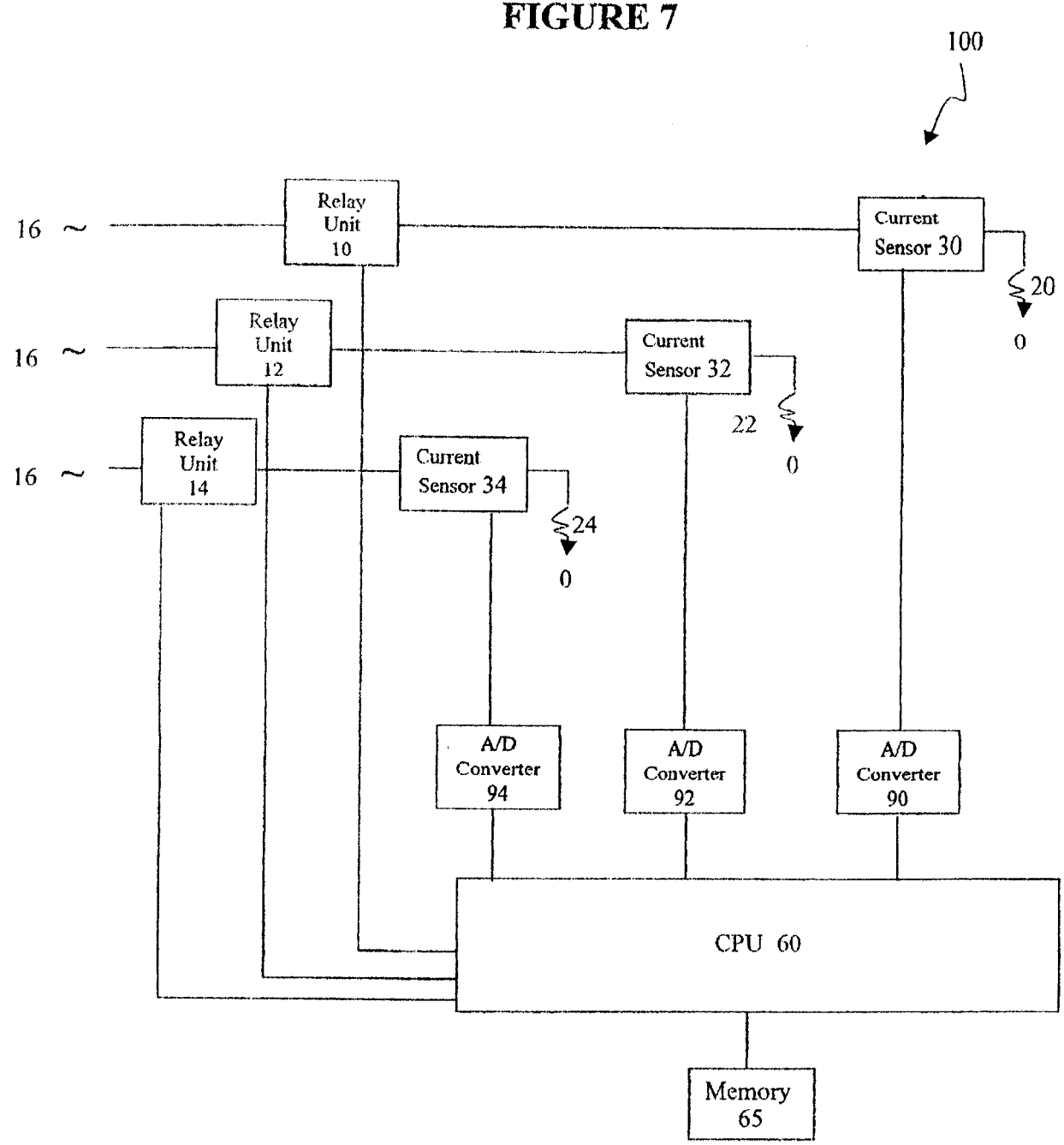
FIG. 7 is a block diagram of a computerized electricity system having an arc fault detecting system, according to another embodiment of the present invention, in which the digital circuit is disposed within the processing unit.

It should be emphasized that the analog to digital (A/D) converting function can be performed within CPU 60, or externally to CPU 60, as shown by way of example in FIG. 7.

Each current sensor and corresponding analog circuit, digital circuit, and relay unit, make up a switch device. Thus, switch device 110, includes current sensor 30, analog circuit 40, digital circuit 50, and relay unit 10.

Figure 2:
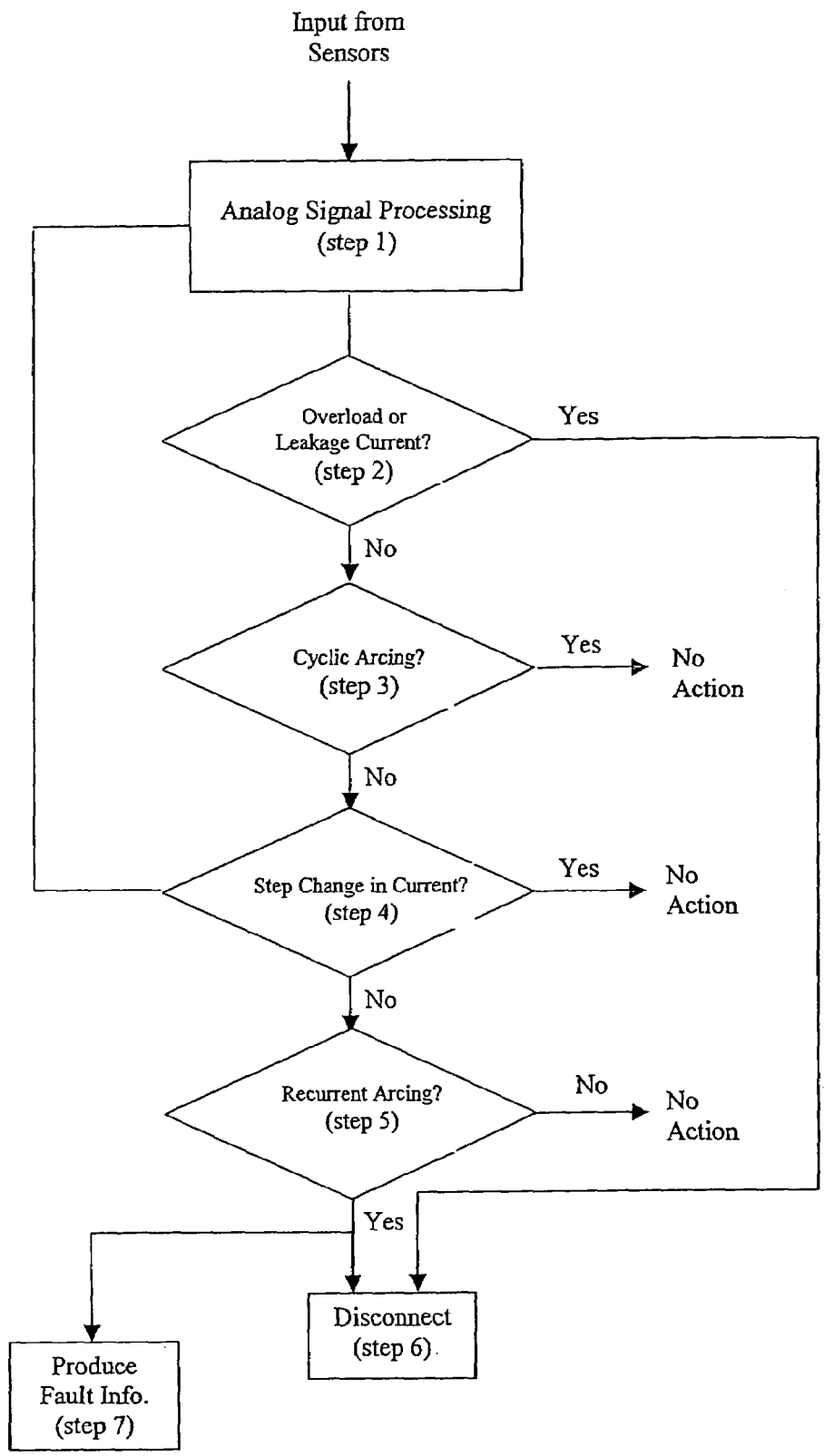
FIG. 2 is a block diagram of a preferred embodiment of an arc fault detecting method, according to the present invention.

FIG. 2 is a block diagram of a preferred embodiment of a fault detecting method, according to the present invention. Input from the current sensors is processed in an analog signal processing stage (step 1), preferably by an analog signal processing circuit such as analog circuit 40, which will be further described hereinbelow. An output signal from the analog signal processing stage is communicated to a digital signal processing stage. If either a high overload or a low overload is detected (step 2), the digital signal processing stage acts to disconnect the current (e.g., by means of relay units such as relay units 10, 12, 14). As will be described in further detail hereinbelow, if the overload is a low overload, the system can disconnect the current in a delayed fashion. Similarly, if the leakage current exceeds a pre-determined threshold, the digital signal processing stage acts to disconnect the current.

As used herein in the specification and in the claims section that follows, the term "potential arc fault event" is meant to exclude a high overload event. Circuit breakers are typically configured to trip when the high overload current reaches five or ten times the nominal current load (short circuit condition).

In the event that a potential arc fault is identified, but no overload (or leakage current) has been detected, the system does not automatically disconnect the current. Rather, the processing unit (or digital circuitry) first determines whether the arcing phenomenon is cyclic (step 3). If so, no disconnection is effected by the system, as the phenomenon is attributable to the behavior of a particular electricity consumer (e.g., an appliance). If no cyclic arcing pattern is identified, the signal is then compared (step 4) with at least one previous signal from the analog signal processing stage, to identify whether a step change in current has occurred. If so, no disconnection is effected by the system, as the phenomenon is attributable to an additional load being connected or disconnected to the circuit. Preferably, the voltage should be monitored, as described hereinbelow, so as to neutralize any fluctuations in voltage from the calculation of the step change.

In one preferred embodiment, steps 3 and 4 are effected by a central processing unit such as CPU 60, using digital data from a digital signal processing stage. The digital information indicates whether a potential arc fault has transpired. Prior to controlling and disconnecting the relay unit associated with the arc fault, the CPU checks various criteria. Thus, in step 4, the CPU determines whether a change in current (typically a step change in current) has occurred, such a change indicating that a load (e.g., an appliance) has been connected or disconnected. If such a step change in current has indeed occurred, the CPU attributes the arc event to routine activity, and essentially ignores the digital information relating to the potential arc fault.

As used herein in the specification and in the claims section that follows, the term "no change in current", "current measurement is substantially unchanged", and the like, refers to a current load having no step change in current. Typically, a step change is indicated if the system observes a stable change in current for at least one second, and more typically, for at least two seconds.

If, however, a (step) change in current has not been observed, the CPU proceeds to determine (step 5) whether the arc event is a recurring arc event, (i.e., that the arc event has occurred a number of times (m) relative to a pre-determined number of times (n) within a pre-determined time (t).

If, within t, m<n, the CPU does not disconnect the associated relay unit, but continues to monitor the situation. If, within t, m≧n, the CPU disconnects the associated relay unit (step 6). Typically, n is an integer greater or equal to two, and is preferably, at least 3; m is an integer, and t is greater than 0.30 seconds, preferably greater than 1.0 second, and most preferably, at least 3 seconds.

Alternatively, the CPU proceeds to determine (step 5) that the arc event is a recurring arc event if at least one arc event is determined within a cycle, for at least 2 or 3 successive clock cycles. In this case, the cycle time is greater than 0.30 seconds, preferably greater than 1.0 seconds, and most preferably, at least 3 seconds.

It will be appreciated by one skilled in the art that digital circuitry can be used to perform steps 3 and/or 4, in lieu of, or in addition to, a CPU. With regard to step 4, both the CPU and such digital circuitry need to be associated with an analog-to-digital signal converter.

In a preferred embodiment of the present invention, the CPU also generates fault information (step 7) regarding the arc fault. The fault information can be used, inter alia, for various diagnostic purposes. To this end, it is preferable to store the fault information in a flash memory, or in another type of memory in which the information is retained when the power is down.

Figure 3:
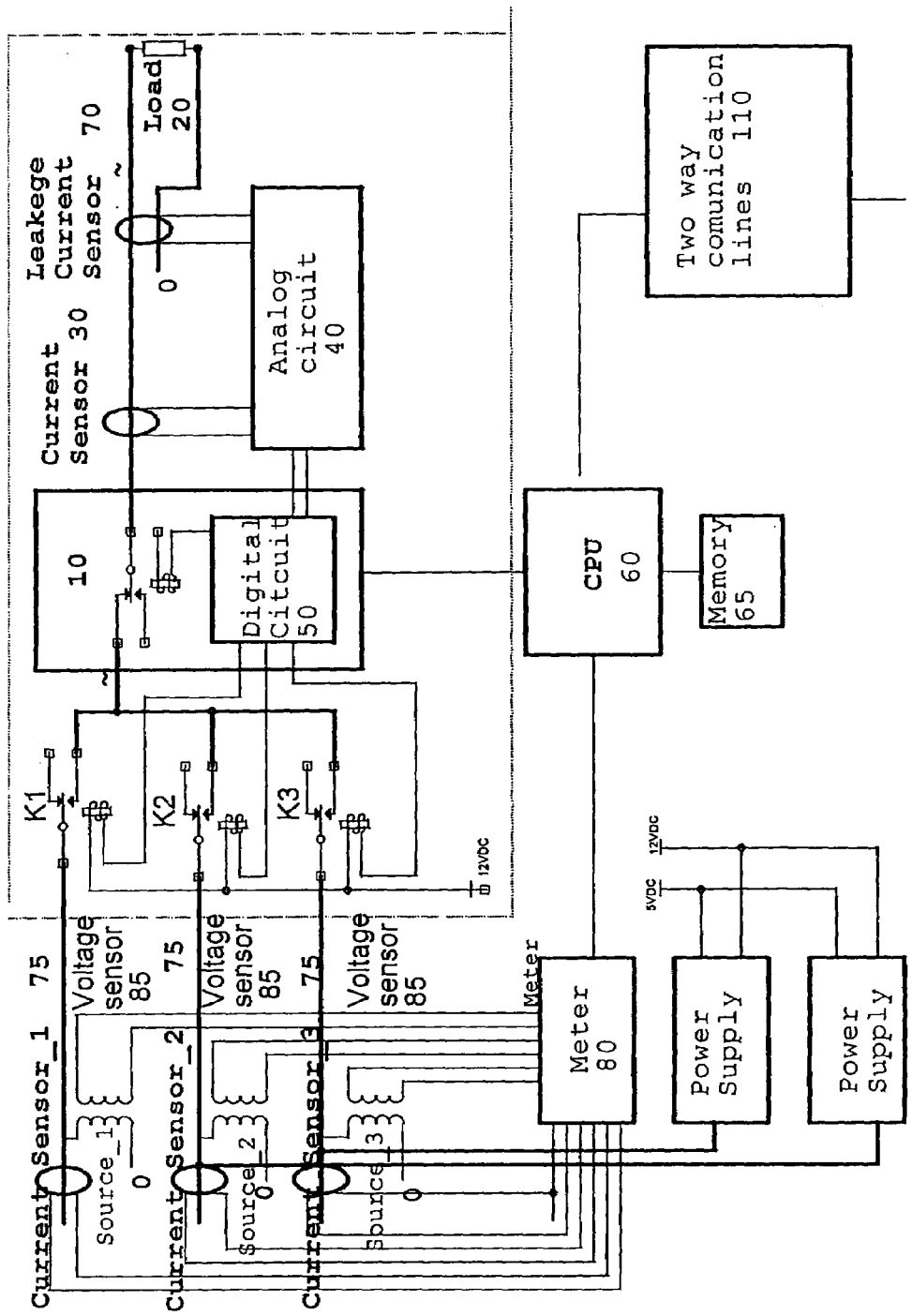
FIG. 3 is a block diagram of a computerized electricity system having an arc fault detecting system, according to the present invention.

FIG. 3 is a schematic diagram of a preferred embodiment of an inventive computerized electricity system (CES) having a fault detecting sub-system for connecting a power source and a load 20, the fault detecting sub-system including current sensor 30, analog circuit 40, digital circuit 50, relay unit 10, CPU 60 and memory 65. Two-way communication lines 110 can be used to receive reports from CPU 60, or to configure CPU 60, e.g., by inputting various parameters.

Various AC sources can be connected to the CES. Thus, by way of example, the CES can be connected to power from the utility company, from a generator, from a solar system, or from a three-phase network system. The CPU preferably has an algorithm that, along with the relevant techno-economic data in the memory, enables the CES to select the source of energy, depending on availability, cost, etc.

The current and voltage from the AC power sources are monitored by current sensors 75 and voltage sensors 85, which are connected to a meter 80. Meter 80 is connected to CPU 60, which stores the information in memory and displays and/or sends the information via communication lines, as requested. The voltage information received from meter 80 is used in evaluating step changes in current, as described hereinabove.

The CES includes current sensors, a first current sensor 30 for measuring the current flow to the output/appliance and, optionally, a second current sensor 70 for measuring the leakage current of the output. The sensors are connected to analog circuit 40, which tests the signal against pre-determined thresholds (described in greater detail hereinbelow), and sends an output signal to digital circuit 50. All the data is transferred to CPU 60 for storing in memory 65 and for further processing, as needed.

Figure 4:
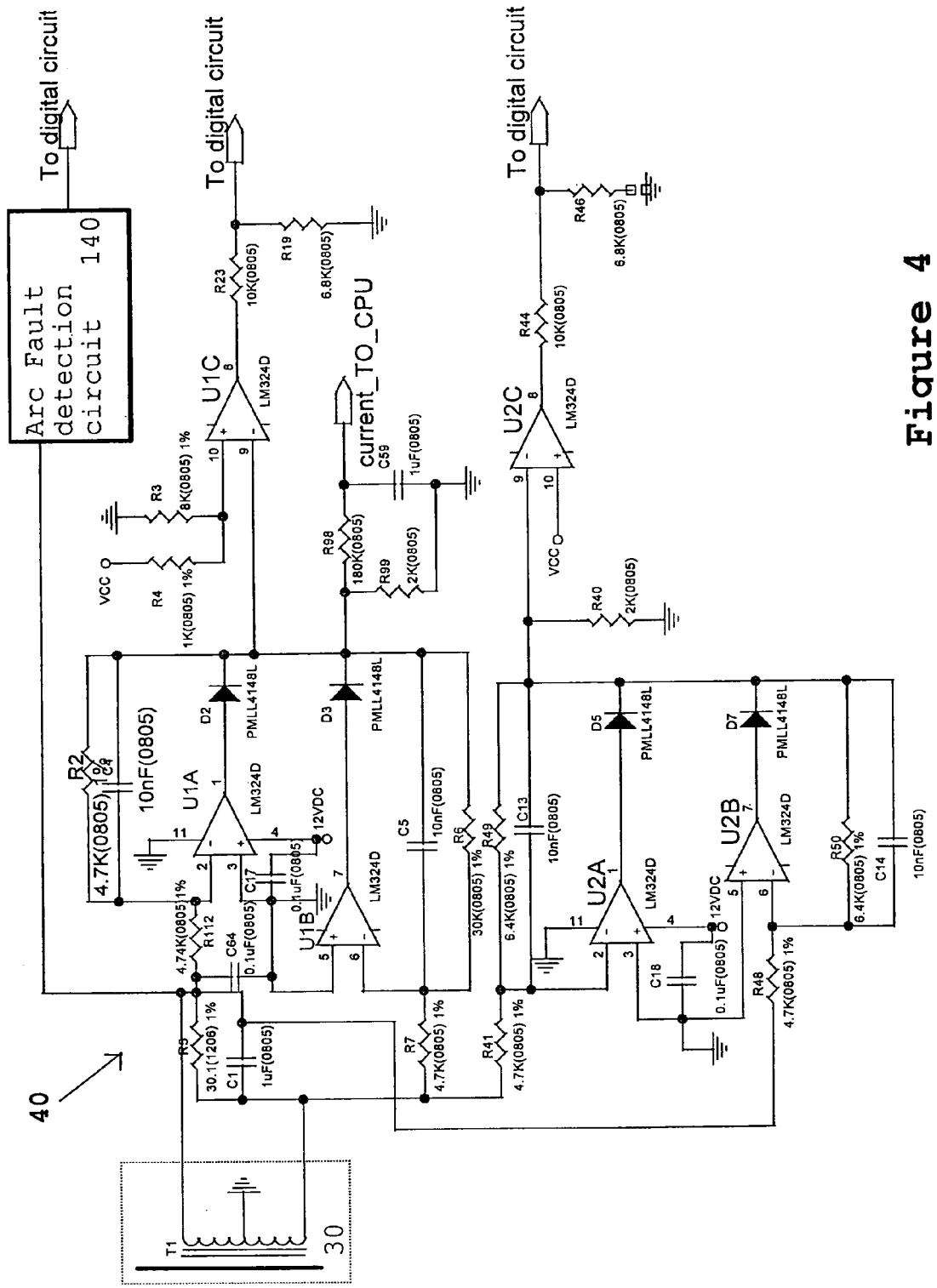
FIG. 4 is an exemplary detailed drawing of an analog circuit of the fault detecting system according to the present invention.

FIG. 4 is an exemplary detailed drawing of an analog circuit 40 according to the present invention. Analog circuit 40 is associated with current sensor 30, which is electrically connected to four operational amplifiers U1A, U1B, U2A, U2B. Between current sensor 30 and these operational amplifiers is disposed a matching circuit including capacitor C1 and resistor R5, for matching the impedance of current sensor 30 and operational amplifiers U1A, U1B, U2A, and U2B.

Each pair of operational amplifiers U1A and U1B, U2A and U2B, represents a full sine wave amplifier. Operational amplifiers U1A and U1B amplify the current wave received from current sensor 30 to a maximum output so as to meet the output requirements of the circuit.

The output of these amplifiers is rectified and then filtered by elements R98 and C59 to make an analog signal to be read by the analog-to-digital input converter associated with the CPU. The other output of operational amplifiers U1A and U1B is connected to a comparator U1C to determine if a low overload has occurred, and to send a low-overload indication to the digital circuit.

The second pair of operational amplifiers U2A and U2B amplifies the current wave received from current sensor 30 to a maximum output, with a lower gain, so as to meet the output requirements of the circuit to meet the output requirements of the circuit.

The output of operational amplifiers U2A and U2B is directed to a high-overload comparator U2C to determine if a high overload has occurred, after which an indication of the high-overload event is provided to the digital circuit.

Figure 5:
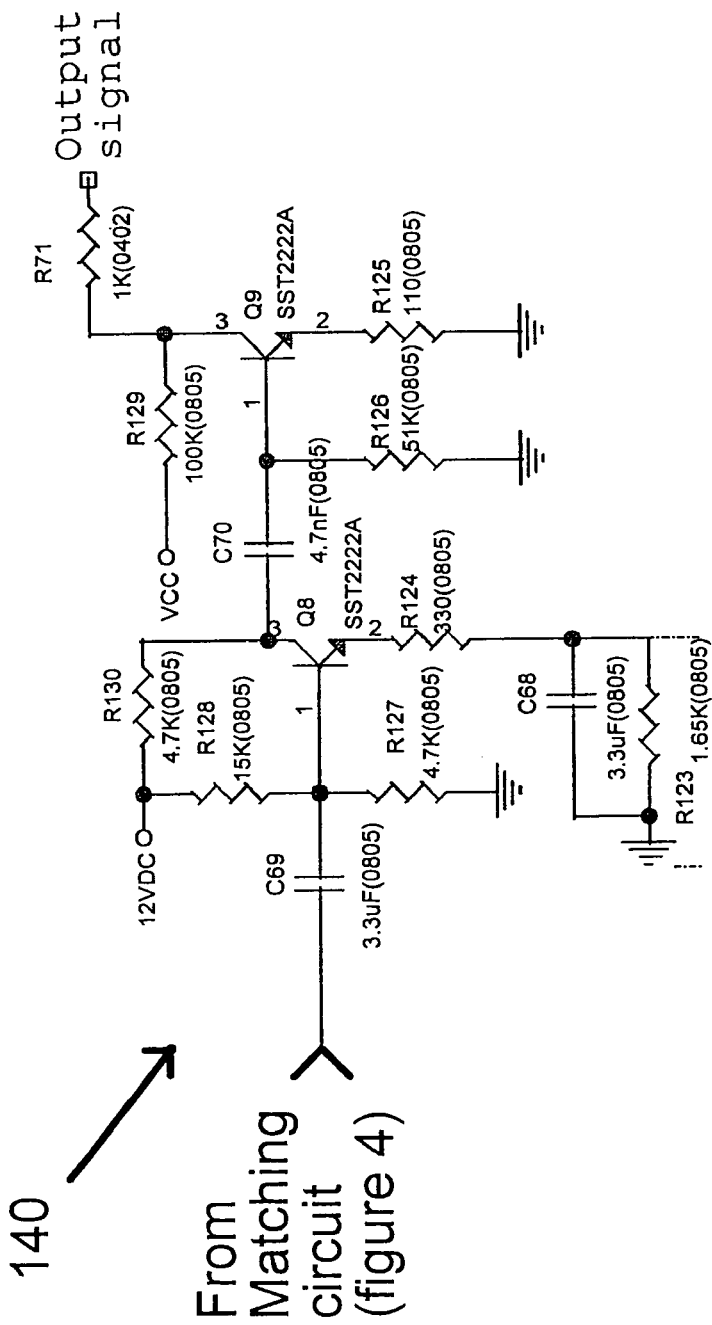
FIG. 5 is an exemplary detailed drawing of an arc-fault detection circuit within the analog circuit of FIG. 4, according to the present invention.

Analog circuit 40 also includes an arc-fault detection circuit 140 according to the present invention. FIG. 5 provides an exemplary detailed drawing of such an arc-fault detection circuit 140. Arc-fault detection circuit 140 receives an analog signal from current sensor 30 via a matching circuit (both of which are shown in FIG. 4). The signal is directed to an amplifier Q8, a high pass filter C70, and an amplifier Q9. When a potential arc fault is detected, the analog output signal goes low.

The signal is converted to a digital signal, and is translated as a raw arc-fault detection signal, either by the digital circuit or by the CPU, as described hereinabove. Unlike various prior-art systems, however, the arc-fault detection signal does not automatically trip the relay to shut off the power. Rather, the signal undergoes analysis, according to the logical flow diagram of FIG. 2.

Figure 6:
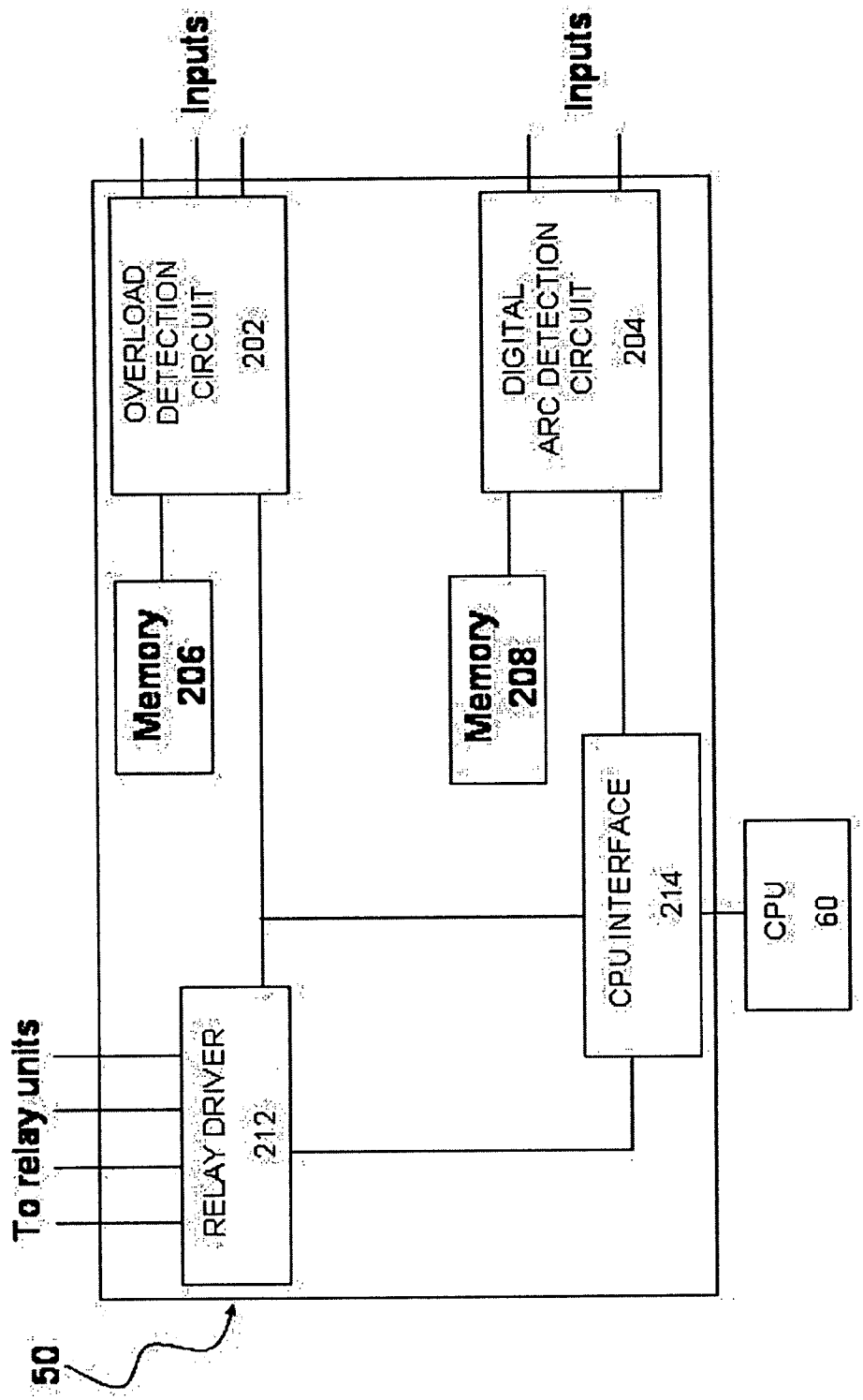
FIG. 6 is an exemplary block diagram of a digital circuit of the fault detecting system according to the present invention.
Figure 1:
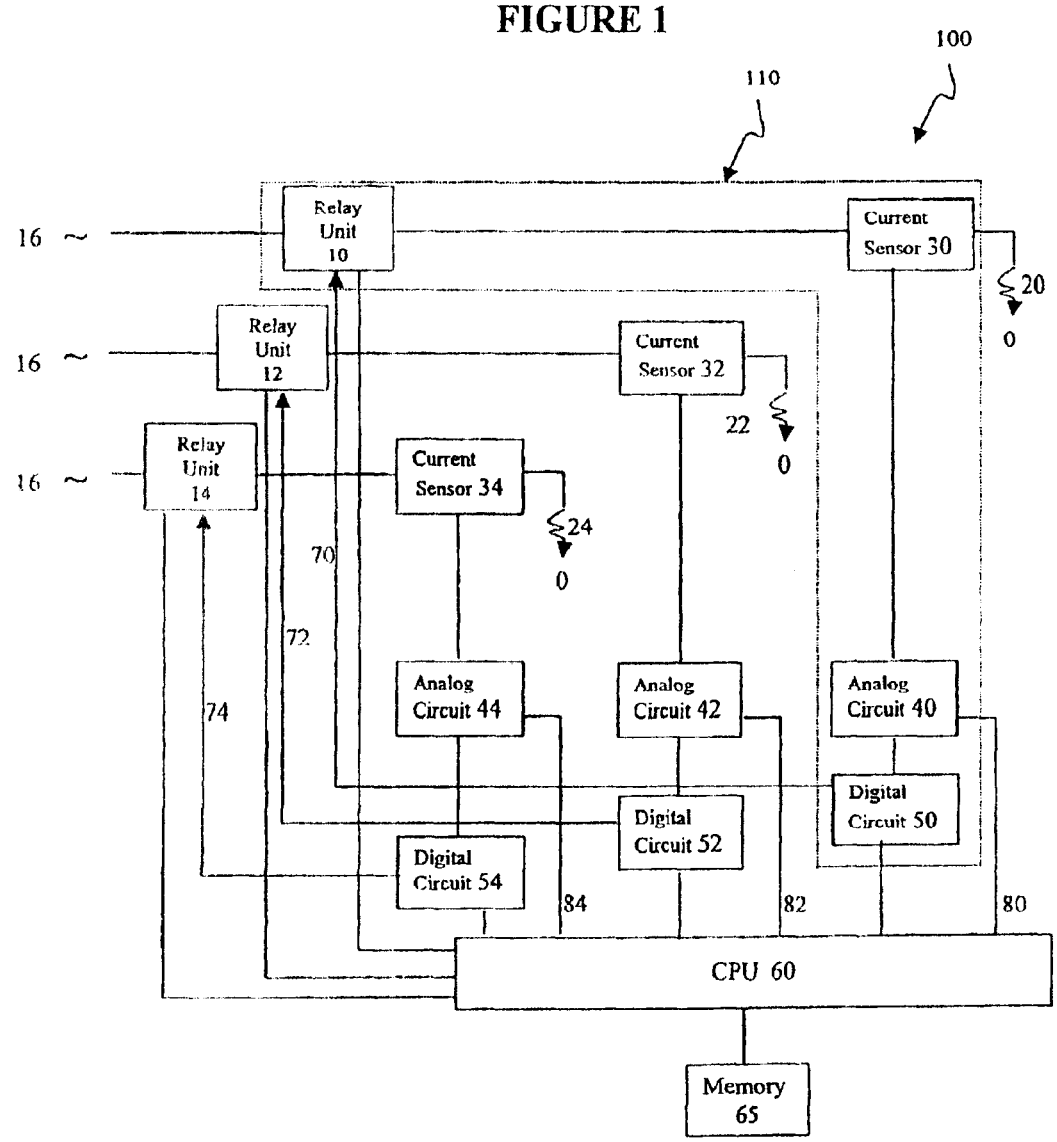
Figure 2:
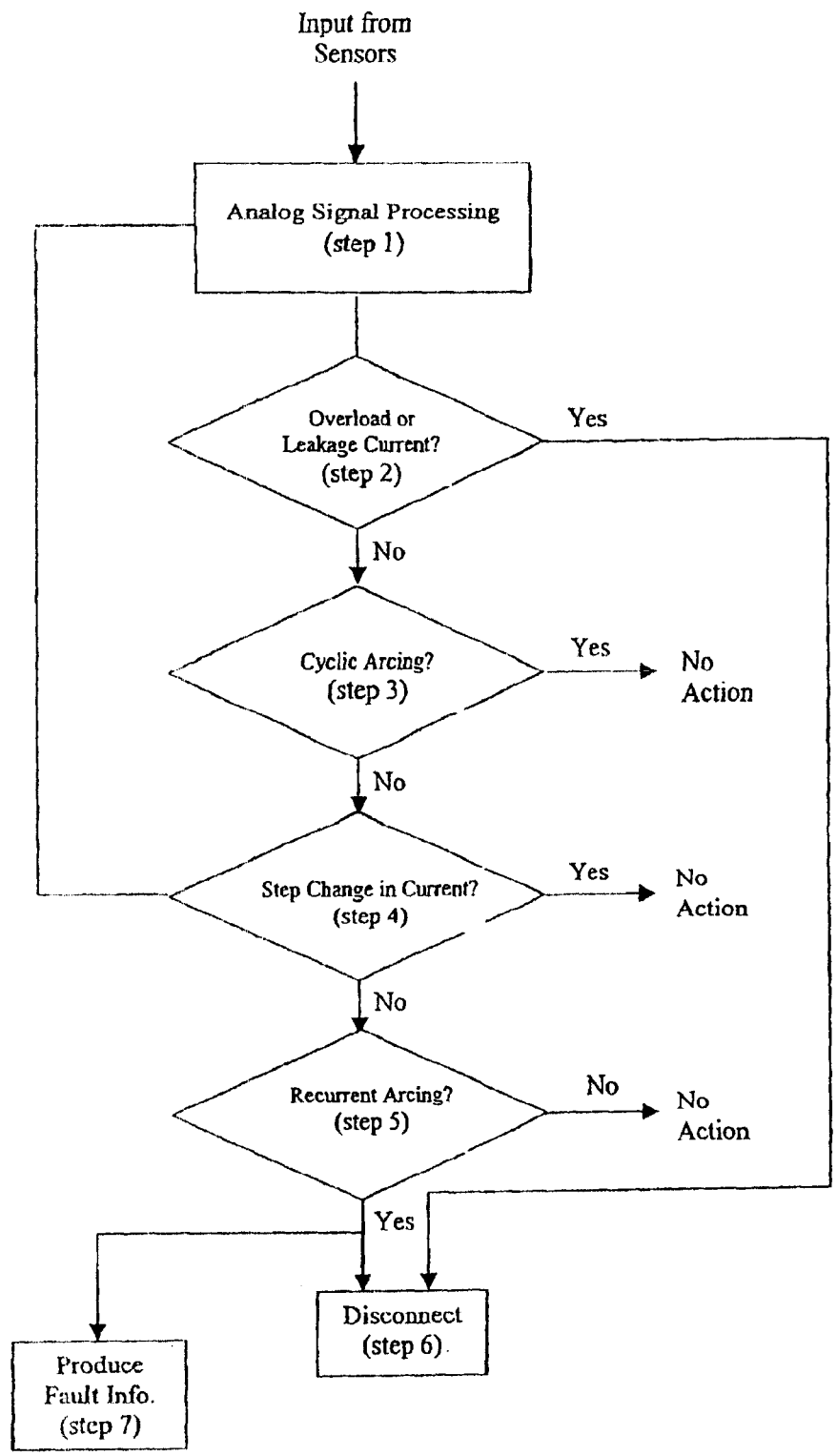
Figure 3:
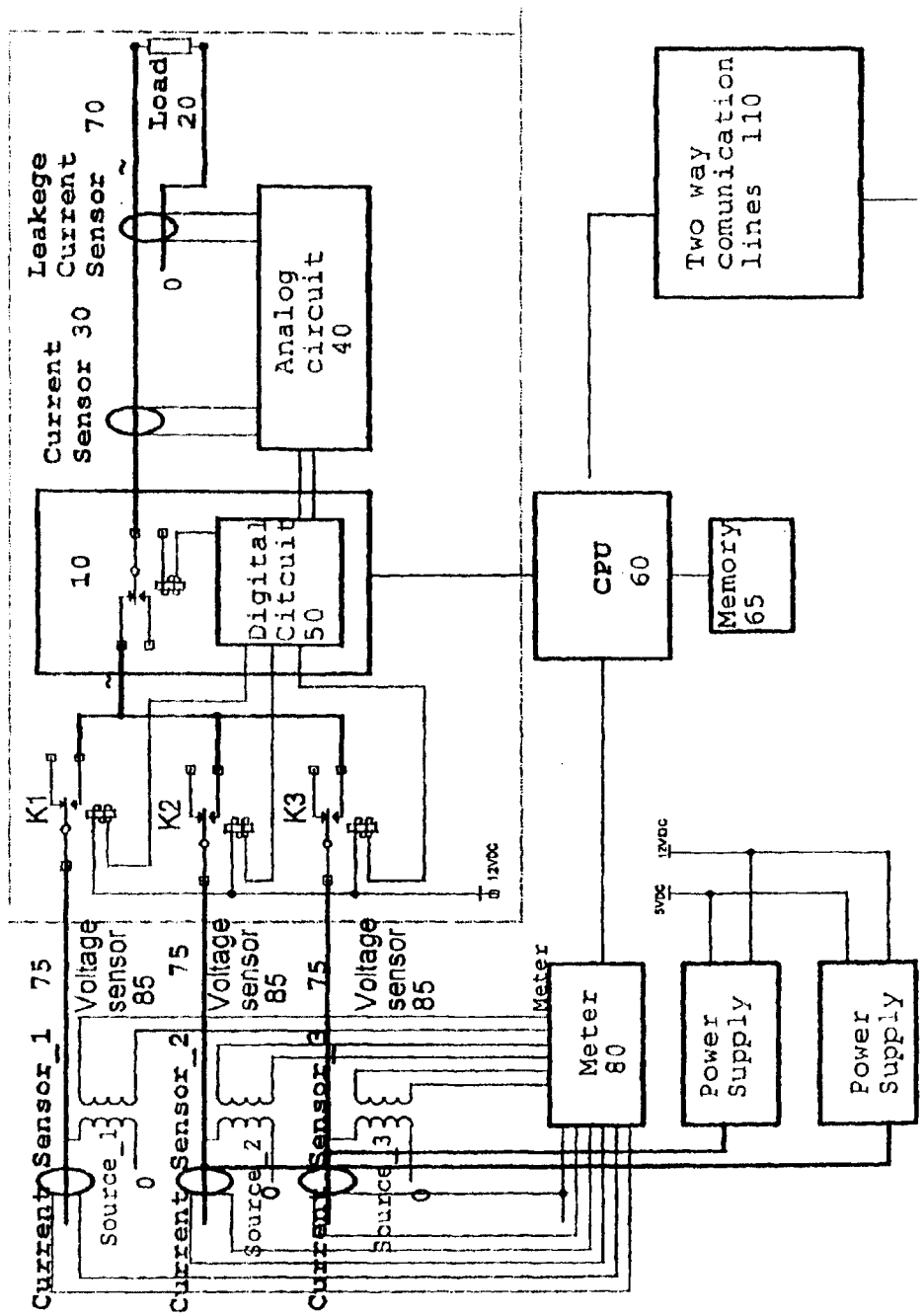
Figure 4:
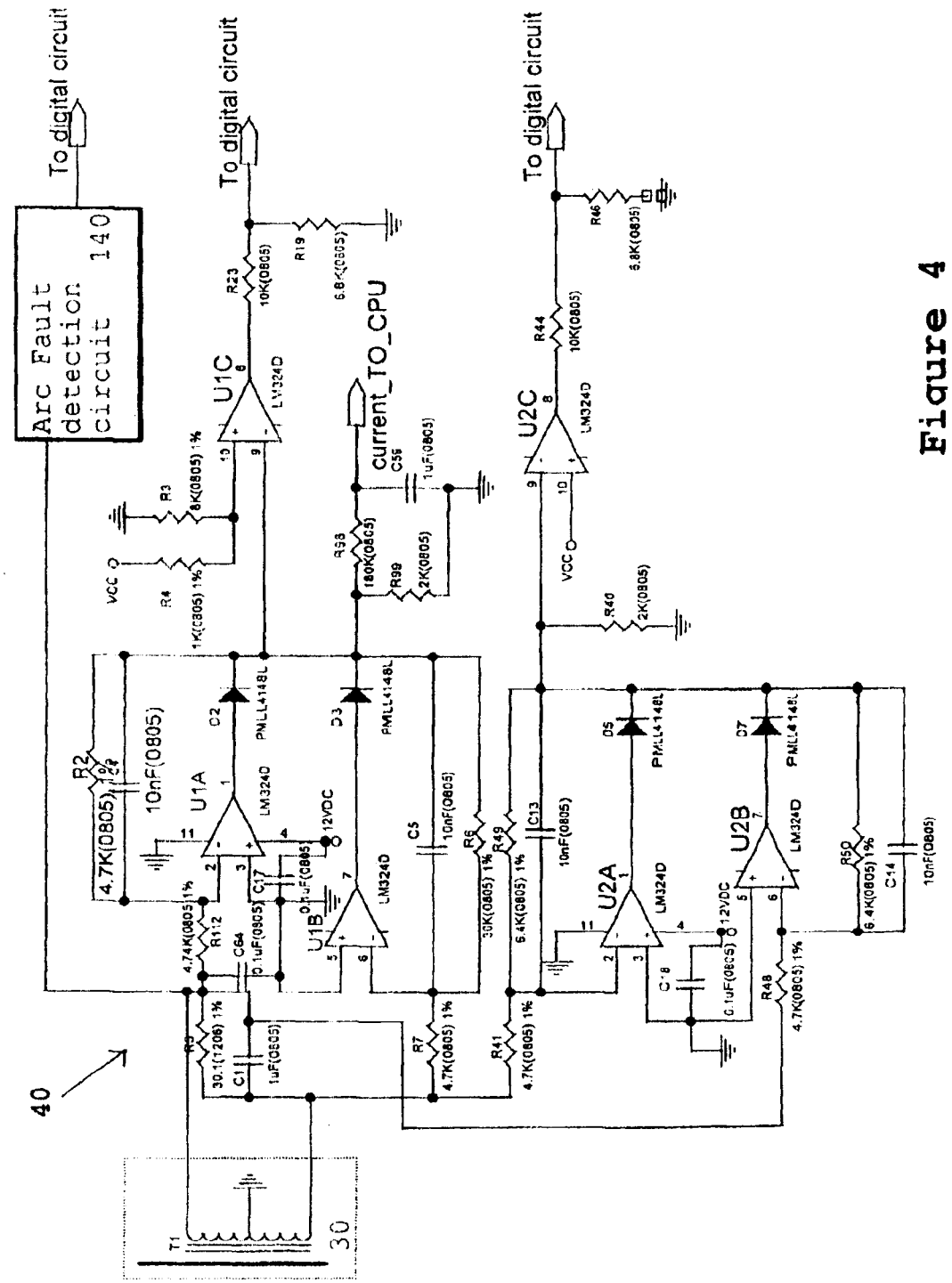
Figure 5:
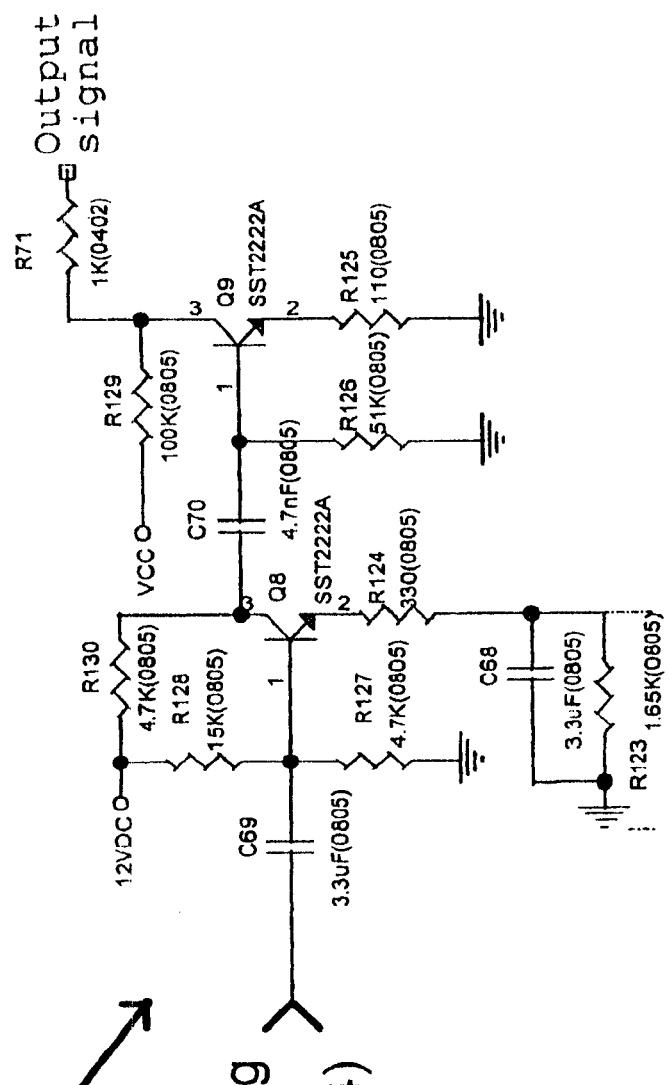

FIG. 6 is an exemplary block diagram of a digital circuit 50 of the fault detecting system according to the present invention. Digital circuit 50 includes an overload detection circuit 202 having an associated memory 206, a digital arc detection circuit 204 having an associated memory 208, a CPU interface 214 for interfacing with CPU 60, and a relay driver 212 for driving relay unit 10 and relay units K1, K2, and K3 (the relay units being schematically illustrated in FIG. 3).

Overload detection circuit 202 preferably receives both high-overload and low-overload input signals. Preferably, overload detection circuit 202 also receives a leakage current input signal from second current sensor 70. Memory 206 enables overload detection circuit 202 to effect a delayed response to relay driver 212, in the event that a low-overload input signal is detected. The delay is preferably at least 20 milliseconds, but the magnitude of the delay can be programmed into the CPU according to the specific characteristics of the load. For example, the starting current for a particular air-conditioning unit is 3-5 times the nominal current, and the duration of this current is about 10 seconds. To prevent tripping of the low overload during the starting period, a duration of 10 seconds (or more) can be set as the delayed response time for activating relay driver 212, in the event that a low-overload input signal is detected. Preferably, the upper threshold of the low-overload current can also be programmed into the CPU (e.g., by means of communication lines 110) according to the specific characteristics of the load.

Digital arc-fault detection circuit 204 preferably receives raw arc-fault detection signals from analog arc-fault detection circuit 140 (shown in FIGS. 4,5). Preferably, digital arc-fault detection circuit 204 also receives an input clock signal, synchronized from the power source, for comparative purposes in detecting cyclic arc faults. If the arc faults are acyclic, CPU shuts off relay driver.

In the event that a raw arc-fault signal is detected, memory 208 enables digital arc-fault detection circuit 204 to effect a delayed input to CPU 60 via CPU interface 214.

CPU interface 214 provides CPU 60 with digital information received from overload detection circuit 202 and digital arc-fault detection circuit 204. For example, if overload detection circuit 202 triggers relay driver 212, the information is passed on to CPU 60.

CPU interface 214 can also receive a command from CPU 60 to trigger relay driver 212. For example, and with reference to FIG. 2, if at step 5, m≧n, CPU 60 activates relay driver 212, via CPU interface 214, to shut off the appropriate relay unit (e.g., relay unit 10).

Alternatively, digital arc-fault detection circuit 204 can be disposed within CPU 60. In this case, CPU interface 214 is not needed. FIG. 7 is a block diagram of a computerized electricity system according to this embodiment of the present invention, in which the digital circuit is disposed within CPU 60. The general features of the system shown in FIG. 7 are identical to those described with reference to FIG. 1. Digital circuits 50, 52, 54 and the requisite functions of analog circuits 50, 52, 54, are disposed within CPU 60.

Analog to digital (A/D) converters 90, 92, 94 convert to a digital signal, the analog signals from current sensors 30, 32, 34. It will be apparent to one skilled in the art that the (A/D) converting function can be effected within CPU 60.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference.

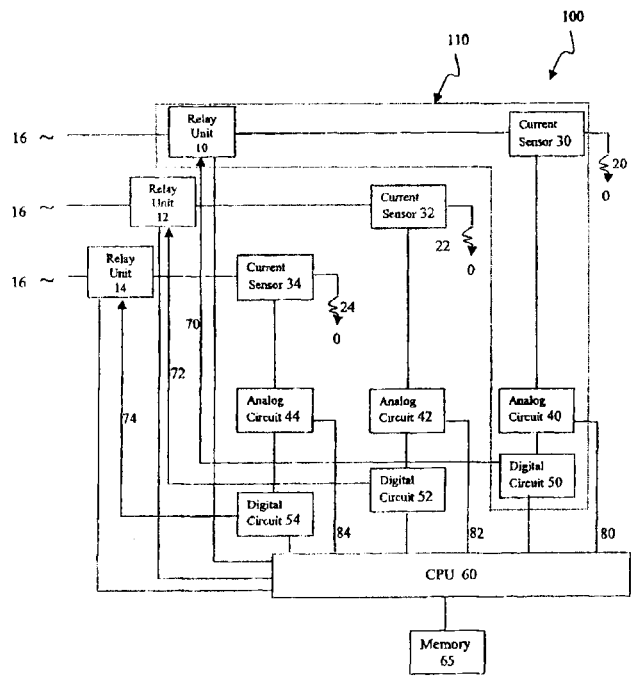

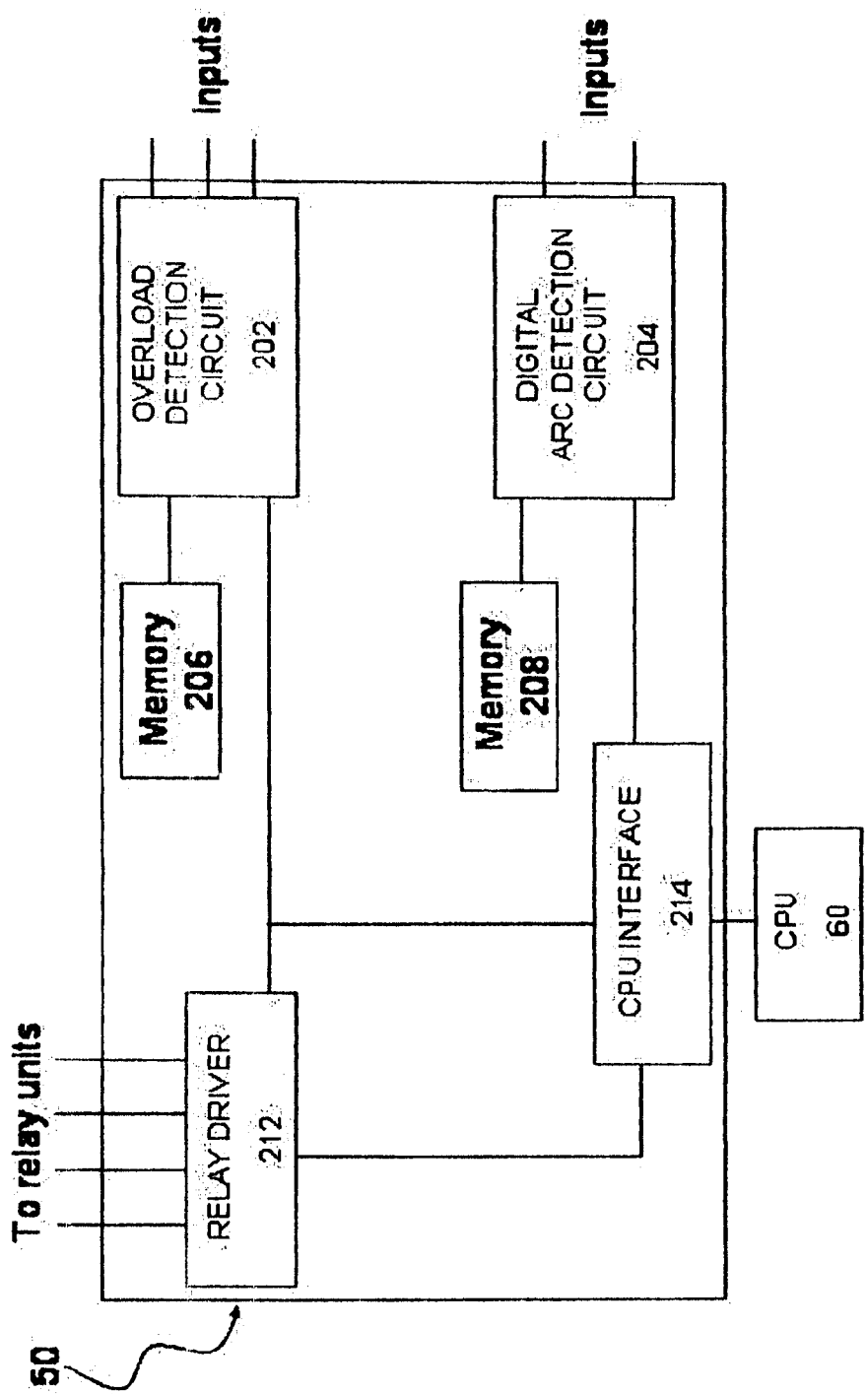

What is claimed is:

1. A computerized electricity system for connecting loads to at least one power source, the computerized electricity system comprising:
 (a) an arc fault detecting sub-system for detecting arc faults, said sub-system having at least one module, each said module including:
  (i) a relay unit, electrically associated with a particular load of the loads, said relay unit for connecting and disconnecting to a power source of the at least one power source;
  (ii) a current sensor for measuring a current being delivered from said power source to the load, so as to produce a current measurement;
  (iii) an analog circuit designed and configured to receive said current measurement from said current sensor, and to produce an analog signal based on said current measurement, and a second signal for indicating a potential arc fault event, and
  (iv) a digital circuit designed and configured to receive said second signal from said analog circuit, and to produce data, and
 (b) a processing unit electrically connected to each said module of said arc fault detecting sub-system, so as to receive data corresponding to said analog signal, and said data from said digital circuit, said processing unit for identifying of said arc faults,
and wherein said processing unit is configured to command said relay unit to disconnect said current in response to said identifying of said arc faults, and wherein said processing unit is configured to provide said command only if several pre-determined conditions are met, said conditions including:
 (I) after a detection of said potential arc fault event by said arc fault detecting sub-system, said current measurement remains substantially unchanged, and
 (II) after a detection of at least one additional potential arc fault event by said arc fault detecting sub-system, said arc fault events are found to occur in an acyclic fashion.

2. The computerized electricity system of claim 1, said conditions further including:
 (III) said potential arc fault event and said at least one additional potential arc fault event occur within a pre-determined amount of time.

3. The computerized electricity system of claim 1, wherein said module is configured to check for a high current overload prior to said detecting of said arc faults.

4. The computerized electricity system of claim 1, wherein said module is configured to measure a low current overload for a period of at least 20 milliseconds, and to only subsequently disconnect said current.

5. The computerized electricity system of claim 1, wherein the computerized system is configured to receive, from a user, an input associated with a particular lag time for disconnecting said current, and wherein said module is configured to measure a low current overload over said particular lag time, prior to said current being disconnected.

6. The computerized electricity system of claim 1, wherein said module is configured to check for current leakage prior to said detecting of said arc faults.

7. The computerized electricity system of claim 2, wherein said pre-determined amount of time is at least 0.3 seconds.

8. The computerized electricity system of claim 2, wherein said pre-determined amount of time is at least 1.0 seconds.

9. The computerized electricity system of claim 2, wherein said pre-determined amount of time is at least 3.0 seconds.

10. The computerized electricity system of claim 2, wherein said pre-determined amount of time is a clock cycle of said processing unit.

11. The computerized electricity system of claim 1, further comprising:
(c) a meter, associated with said power supply and a voltage sensor, for providing voltage information to said processing unit.

12. The computerized electricity system of claim 11, wherein said processing unit is configured to utilize said voltage information in evaluating said change in load.

13. The computerized electricity system of claim 11, wherein said processing unit is configured to utilize said voltage information to neutralize an effect of voltage fluctuation on said change in load.

14. The computerized electricity system of claim 1, wherein said second signal is a digital signal.

15. A computerized electricity system for connecting loads to at least one power source, the computerized electricity system comprising:
an arc fault detecting sub-system for detecting arc faults, said sub-system including:
(a) at least one relay unit, electrically associated with a particular load of the loads, said relay unit for connecting and disconnecting to a power source of the at least one power source;
(b) at least one current sensor for measuring a current being delivered from said power source to the load, so as to produce a current measurement;
(c) a processing unit electrically connected to said relay unit and to said current sensor, said processing unit configured so as to receive a signal corresponding to said current measurement,
and wherein said processing unit is configured to command said relay unit to disconnect said current in response to said detecting of said arc faults,
and wherein said processing unit is configured to provide said command only if several pre-determined conditions are met, said conditions including:
(I) after detection of said potential arc fault event by said processing unit, using said signal, said current measurement is substantially unchanged, and
(II) after detection of at least one additional potential arc fault event by said processing unit, using said signal, said arc fault events are found to occur in an acyclic fashion.

16. The computerized electricity system of claim 15, said conditions further including:
(III) said potential arc fault event and said at least one additional potential arc fault event occur within a pre-determined amount of time.

17. The computerized electricity system of claim 15, wherein said processing unit is configured to disconnect said current after said current measurement indicates a low current overload for a period of at least 20 milliseconds.

18. The computerized electricity system of claim 15, wherein the computerized system is configured to receive, from a user, an input associated with a particular lag time for disconnecting said current, and wherein said processing unit is configured to disconnect said current after said current measurement indicates a low current overload for said particular lag time.

19. The computerized electricity system for connecting loads to at least one power source, the computerized electricity system comprising:
an arc fault detecting sub-system for detecting arc faults, said sub-system including:
(a) at least one relay unit, electrically associated with a particular load of the loads, said relay unit for connecting and disconnecting to a power source of the at least one power source;
(b) at least one current sensor for measuring a current being delivered from said power source to the load, so as to produce a current measurement;
(c) a processing unit electrically connected to said relay unit and to said current sensor, said processing unit configured so as to receive a signal corresponding to said current measurement,
and wherein said processing unit is configured to command said relay unit to disconnect said current in response to said detecting of said arc faults,
and wherein said processing unit is configured to provide said command only if several pre-determined conditions are met, said conditions including:
(I) after detection of said potential arc fault event by said processing unit, using said signal, said current measurement is substantially unchanged, and
(II) after detection of at least one additional potential arc fault event by said processing unit, using said signal, said arc fault events are found to occur within a pre-determined amount of time.

20. The computerized electricity system of claim 19, wherein said pre-determined amount of time is at least 0.3 seconds.

* * * * *

UNITED STATES PATENT AND TRADEMARK OFFICE
CERTIFICATE OF CORRECTION

| | |
|---|---|
| PATENT NO. | : 7,282,924 B1 |
| APPLICATION NO. | : 11/427345 |
| DATED | : October 16, 2007 |
| INVENTOR(S) | : Lupu Wittner |

It is certified that error appears in the above-identified patent and that said Letters Patent is hereby corrected as shown below:

Delete the title page and substitute therefore the attached title page showing the corrected number of drawing sheets in patent.

Delete Drawing Sheets 1-6 and substitute therefore the attached Drawing Sheets 1-7.
(FIG. 7 has been added to drawing sheets)

Signed and Sealed this
Thirtieth Day of August, 2011

David J. Kappos
*Director of the United States Patent and Trademark Office*

(12) United States Patent
Wittner

(10) Patent No.: US 7,282,924 B1
(45) Date of Patent: Oct. 16, 2007

(54) COMPUTERIZED ELECTRICITY SYSTEM HAVING AN ARC FAULT DETECTING SUB-SYSTEM

(75) Inventor: Lupu Wittner, Netanya (IL)

(73) Assignee: Target Hi-Tech Electronics Ltd., Netanya (IL)

( * ) Notice: Subject to any disclaimer, the term of this patent is extended or adjusted under 35 U.S.C. 154(b) by 0 days.

(21) Appl. No.: 11/427,345

(22) Filed: Jun. 29, 2006

(51) Int. Cl.
*G01R 31/08* (2006.01)
*H01H 9/50* (2006.01)
*H02H 3/00* (2006.01)

(52) U.S. Cl. .................. 324/536; 361/42; 700/293
(58) Field of Classification Search .......... 324/536, 324/522; 361/42, 57; 702/58, 64; 700/292, 700/293

See application file for complete search history.

(56) References Cited

U.S. PATENT DOCUMENTS

| 6,242,922 B1* | 6/2001 | Daum et al. ............. 324/520 |
| 7,110,864 B2* | 9/2006 | Restrepo et al. ......... 700/293 |
| 2003/0030448 A1* | 2/2003 | Sapir ...................... 324/536 |
| 2006/0215335 A1* | 9/2006 | Deshpande et al. ....... 361/42 |

* cited by examiner

*Primary Examiner*—Anjan Deb
(74) *Attorney, Agent, or Firm*—Mark M. Friedman

(57) ABSTRACT

A computerized electricity system for connecting loads to a power source, including: (a) an arc fault detecting sub-system having at least one module including: (i) a relay unit, electrically associated with a particular load, for connecting and disconnecting to a power source; (ii) a current source for measuring a current being delivered from the power source to the load, to produce a current measurement; (iii) an analog circuit for receiving the current measurement from the current sensor, and for producing an analog signal based on the current measurement, and a second signal for indicating a potential arc fault event, and (iv) a digital circuit for receiving the second signal from the analog circuit and producing data, and (b) a processing unit connected to each module, so as to receive data corresponding to the analog signal, and the data from the digital circuit, the processing unit for identifying the arc faults, and wherein the processing unit is configured to command the relay unit to disconnect the current in response to identifying the arc faults, and wherein the processing unit is configured to provide this command only if several pre-determined conditions are met, (I) after detection of the potential arc fault event, the current measurement remains substantially unchanged, and (II) after a detection of at least one addition potential arc fault event, the arc fault events are found to be acyclic.

20 Claims, 7 Drawing Sheets